UNITED STATES PATENT OFFICE.

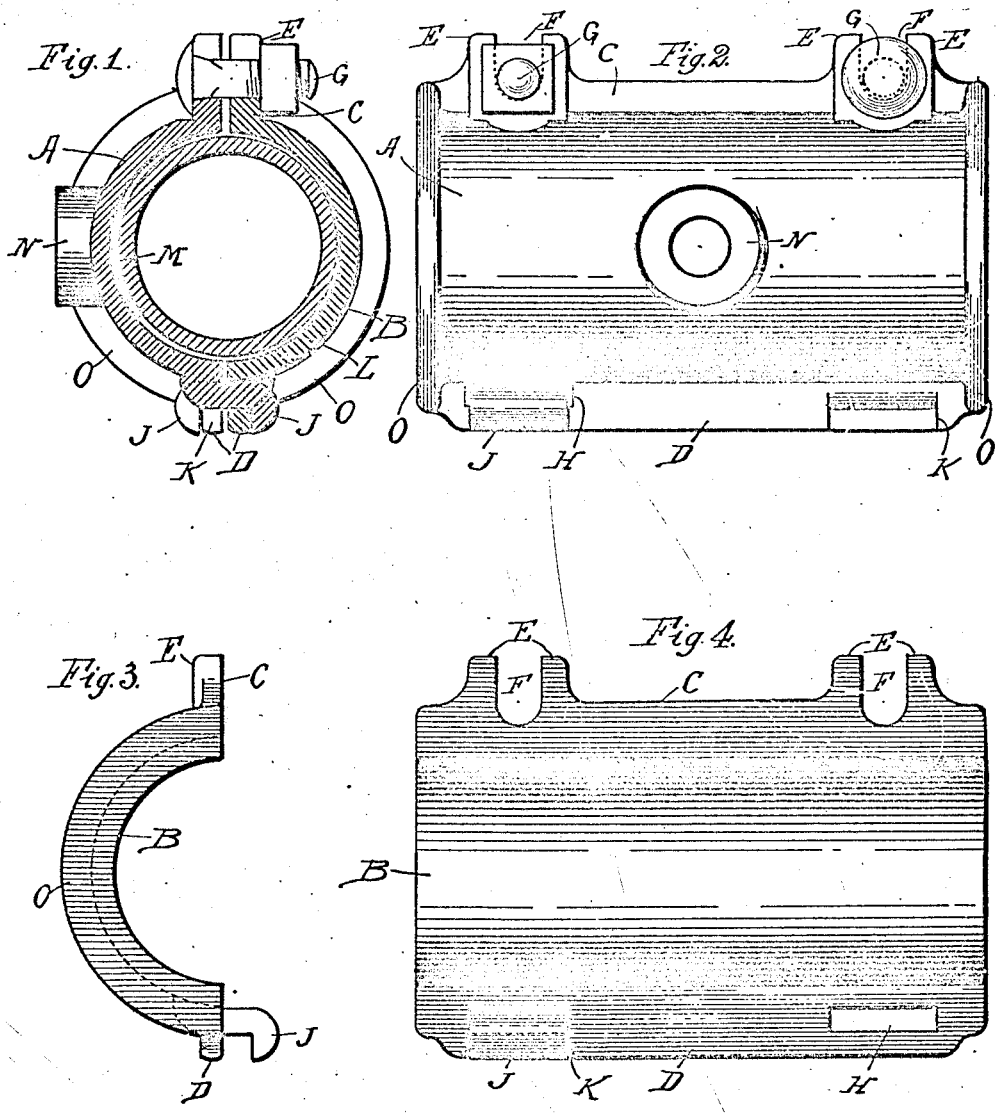

OLAUS S. AUGENSEN, OF CHICAGO, ILLINOIS.

PIPE-CLAMP.

No. 895,143.

Specification of Letters Patent.

Patented Aug. 4, 1908.

Application filed September 6, 1907. Serial No. 391,582.

*To all whom it may concern:*

Be it known that I, OLAUS S. AUGENSEN, citizen of the United States, residing at Chicago, in the county of Cook and State of Illinois, have invented certain new and useful Improvements in Pipe - Clamps; and I do hereby declare the following to be a full, clear, and exact description of the invention, such as will enable others skilled in the art to which it appertains to make and use the same.

This invention relates to a novel construction in a pipe clamp particularly adapted for use as a temporary means for stopping leaks caused by cracked pipes or by reason of sand holes and the like therein, the object being to provide a simple and efficient device of this character which can be easily and quickly applied and consists in features of construction and combinations of parts hereinafter fully described and claimed.

In the accompanying drawings illustrating the invention Figure 1 is a transverse section of a pipe clamp constructed in accordance with my invention showing the same disposed upon a pipe. Fig. 2 is a side elevation of the same. Figs. 3 and 4 are respectively an end and inner face view of one member of the clamp.

The sole object of my invention is to provide a pipe clamp for repairing leaks in pipes which consists of two members identical with each other and cast from the same pattern and which are adapted to interlock with each other at one edge portion and be easily secured together by bolts at the other edge portion whereby said members are not only rendered convenient of use and the necessity of pairing avoided but are also rendered cheaper to manufacture the invention residing most particularly in the specific form of interlocking means employed.

My said clamp consists of two equal substantially semi-cylindrical members A and B each of which is provided on its long edges with flanges C and D respectively. The said flange C is provided with a plurality of projections E having recesses F therein for the reception of bolts G by means of which said members are secured together at one side. Each of said flanges D of said members is provided with a longitudinal slot H adjacent one end and adjacent the other end thereof with a hook J projecting from the inner face of said flange, the latter being cut away as at K in alinement with the free end of said hook. When said members A and B are opposed the hooks J of each is adapted to enter the slot H in the flange of the other thus interlocking said members on said edge. The said members A and B are adapted to receive and embrace the pipe L and a strip of rubber or other suitable packing M which is clamped and firmly held by said members A and B in contact with the leaky portion of the pipe to seal such leak in a well-known manner. One of said members A or B may be provided with a nipple N to receive a rod or the like thus adapting the device for use as a pipe hanger. I do not however, contemplate providing said nipples as said members would seldom if ever, be employed for such purpose. Both said members A and B are identical and cast from a single pattern and by reason of the recesses F the bolts with the nuts in place may be dropped into the same and by a few turns of said members toward each other so as to firmly compress the packing against the pipe. The operation is thus rendered very easy and rapid and annoyance arising from dropping of nuts, etc., is largely avoided. The said members A and B are preferably provided at their ends with peripheral flanges O to reinforce the same.

I claim as my invention:

1. A pipe clamp consisting of two equal substantially semi-cylindrical members each provided on one edge portion with a male and a female interlocking device each adapted when said members are opposed to engage the other of said opposed member to interlock the same, and flanges on the other edges of said members provided with slots adapted to receive bolts by means of which said members are secured to each other at said edges.

2. A pipe clamp comprising two equal substantially semi - cylindrical members each provided on its long edges with flanges, one flange of each being provided with a slot adjacent one end, a hook projecting from said slotted flange adjacent its other end and adapted when said members are opposed to enter the slot in said flange of said other member to interlock said members on said edge portion, said other flanges of said members being provided in their free ends with recesses and bolts entering said recesses, and engaging said flanges to secure said members together and draw the same toward each other to contract the same on a pipe.

In testimony whereof I have signed my name in presence of two subscribing witnesses:

OLAUS S. AUGENSEN.

Witnesses:
RUDOLPH WM. LOTZ,
A. FRANCK-PHILIPSON.